United States Patent [19]

Korabiak

[11] Patent Number: 5,062,440

[45] Date of Patent: Nov. 5, 1991

[54] TREMOR-RESPONSIVE SHUT-OFF VALVE

[76] Inventor: Walter Korabiak, 103 Crine Rd., Morganville, N.J. 07751

[21] Appl. No.: 644,196

[22] Filed: Jan. 22, 1991

[51] Int. Cl.$^5$ .................................... F16K 17/36
[52] U.S. Cl. ............................................ 137/38
[58] Field of Search ........................ 137/38, 39, 45

[56] References Cited

U.S. PATENT DOCUMENTS

| | | | |
|---|---|---|---|
| 378,938 | 3/1888 | Parker | 137/38 X |
| 1,405,950 | 2/1922 | Stafford | 137/38 |
| 4,165,758 | 8/1979 | Douce | 137/38 |
| 4,844,113 | 7/1989 | Jones | 137/39 |

Primary Examiner—Robert G. Nilson
Attorney, Agent, or Firm—Charles I. Brodsky

[57] ABSTRACT

The apparatus of the invention incorporates a ball-cock valve incorporated within a gas or water main, or pipe. The valve is provided with a handle to controllably open or close the gas or water flow, and the handle is coupled to an actuator weight. The "weight" quiescently rests on the platform of a stand situated above the handle and angularly sloped toward it. With the valve initially opened, earthquake tremors of a prescribed magnitude serve to shake the weight off the platform, and its fall automatically rotates the handle to close the valve and seal off the main or pipe.

8 Claims, 1 Drawing Sheet

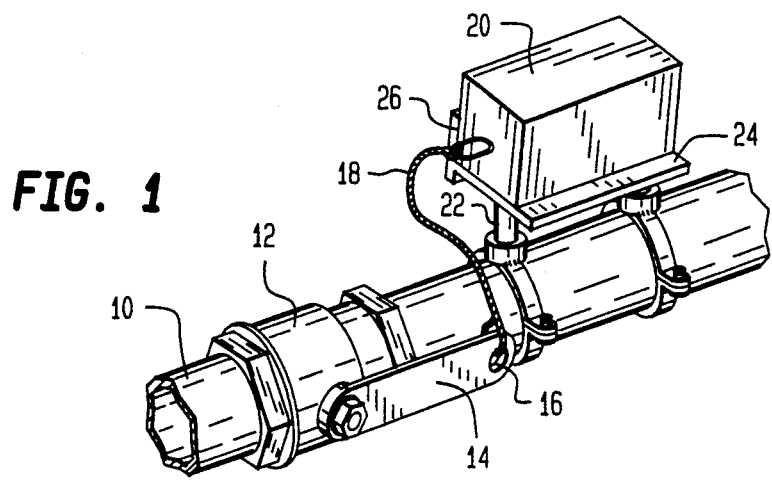
FIG. 1
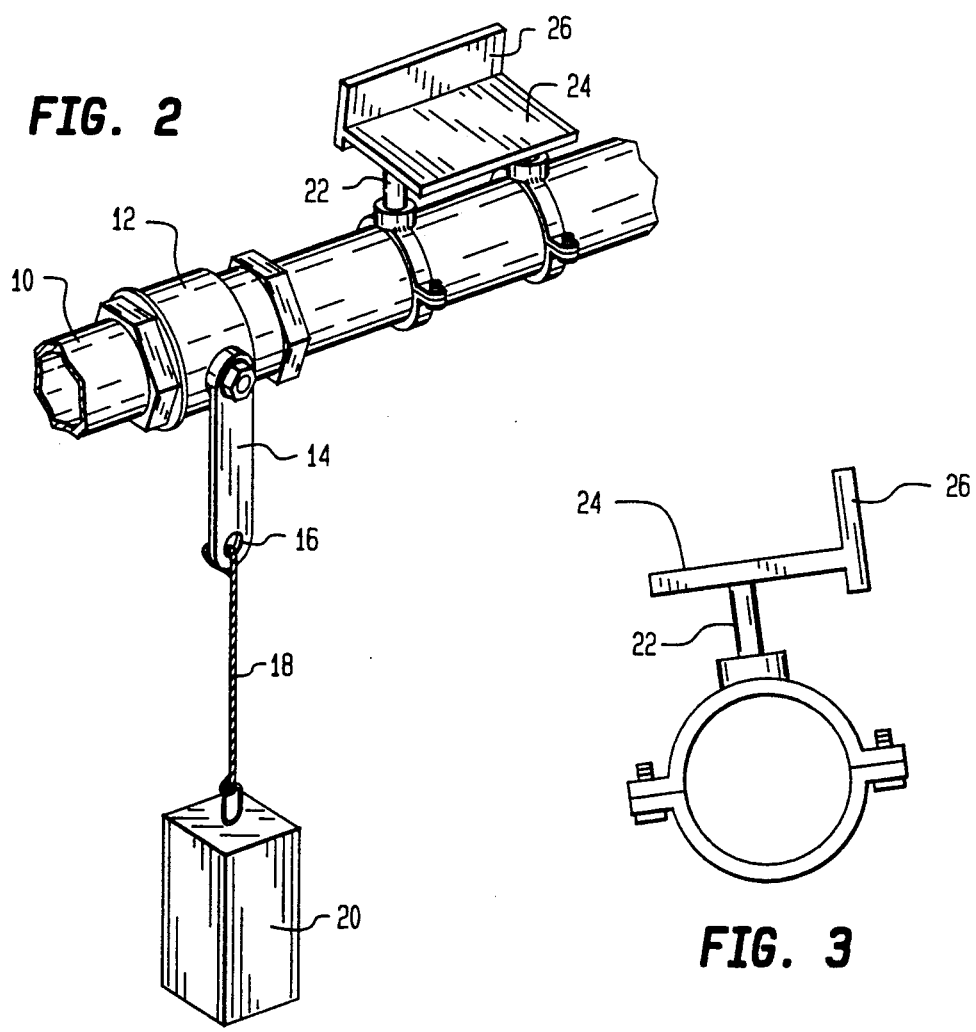
FIG. 2
FIG. 3

TREMOR-RESPONSIVE SHUT-OFF VALVE

FIELD OF THE INVENTION

This invention relates to gas and water main shut-off valves, in general, and to such valves as are able to automatically operate to seal-off the main in response to earthquake tremors of a prescribed magnitude, in particular.

BACKGROUND OF THE INVENTION

As is well known and understood, major damage during earthquake conditions result from a rupture of a gas or water main in a residential home. If the gas main, or pipe, cracks as a result of the tremor, the leaking gas could eventually be ignited by a pilot light at the hot water heater, furnace, or oven range, and an explosion results. If the crack or rupture is in the water main or pipe, flooding can ensue. Similar such problems will obviously be seen to be present in commercial and business establishments, as well, to magnify the potential problem and catastrophe. Clearly, a need for an automatically-operating shut-off valve of some type is needed to seal-off these mains or pipes once a seismic condition is detected. And, at the same time, it will be equally clear that a valve is required which can be easily re-set once the condition has cleared; and, further, to be of a type which operates independently of the existence of electricity, as electrical power may very well not be available where the earthquake would be such as to knock-down the electrical power system. At the same time, it would be additionally desirable to develop such a valve as would be operative to disable the electrical system at the home or commercial establishment even if it were continued to be supplied, as any electrical arcing produced as the system is damaged might, in and of itself, ignite any leaking gas that might be present.

Thus, it is an object of the invention to provide a shut-off valve for a gas or water main which automatically senses the existence of a tremor of a prescribed magnitude, and to operate, without any degree of electrical control, to automatically seal-off the gas or water main, yet be easily re-set once the tremors have terminated.

SUMMARY OF THE INVENTION

As will become clear hereinafter, the apparatus of the invention incorporates a ball-cock valve incorporated within the gas or water main, or pipe, and of a type provided with a handle to controllably open or close the gas or water flow. As will be seen hereinafter, the handle of the valve is coupled to an actuator weight, which quiescently rests on the platform of a stand situated above the handle. With the platform angularly sloped towards the handle, and with the handle rotated so that the valve is initially opened, the apparatus operates so that earthquake tremors of a prescribed magnitude serve to shake the weight off the platform, to enable its ensuing fall to automatically rotate the handle of the ball-cock valve to close off the valve and seal the main or pipe.

As will also be described below, the ball-cock valve, in a preferred embodiment of the invention is "gas-rated", so as to fit the need to which it is used, and the size the "weight" employed is selected according to the size of the valve in conjunction with which it operates. As will also be appreciated, the platform can be angularly adjusted in differing amounts so as to regulate the tremor magnitude needed to shake the "weight" from the platform, and can be of a varying friction characteristic to also regulate the tremor magnitude needed to actuate the handle to the "seal-off" position. And, as will be appreciated, the apparatus of the invention can be modified so that the falling weight—when properly selected and the apparatus initially installed accordingly—can even serve to automatically shut-off the power at an electrical circuit-breaker box, as an alternative to rotating a handle on a ball-cock shut-off valve.

BRIEF DESCRIPTION OF THE DRAWING

These and other features of the present invention will be more clearly understood from a consideration of the following description, taken in connection with the accompanying drawing, in which:

FIG. 1 is a perspective view of the apparatus of the invention, helpful in an understanding of its operation with the actuator weight quiescently on the platform and stand;

FIG. 2 is a perspective view showing the apparatus with the actuator weight being dislodged, in automatically sealing-off the main, or pipe, or shutting down the electrical system at a power circuit-breaker box; and FIG. 3 is a partial, sectional view of the platform and stand showing its construction and the angular sloping which serves as an adjustable control for predeterminedly setting the magnitude of tremor at which the apparatus becomes operational.

DETAILED DESCRIPTION OF THE DRAWING

In the drawings, reference numeral 10 schematically illustrates a gas or water main, or pipe, which a ball-cock valve 12 is desired to automatically seal-off in the presence of detected earthquake tremors of a prescribed level. The ball-cock valve 12 is of a type that is "gas-rated", and can be obtained in most plumbing supply stores where not initially part of the overall installation system, for later insertion by a qualified plumber or gas-company mechanic. Any type of gas-rated ball-cock valve may be employed, which, by-and-large, come constructed with a handle 14 arranged so that when rotated to a "horizontal" position, the valve 12 is "opened", and when rotated to a "down" position, the valve 12 is "closed". In accordance with the invention, a hole 16 is drilled into the handle 14 at a point remote from the valve 12, and a chain 18 of appropriate strength is inserted so as to secure to an actuator weight 20, fabricated of concrete, steel, or any other appropriate composition material.

In a preferred embodiment of the invention, a stand 22 is provided about the main or pipe 10, to support a platform 24 extending above the main or pipe 10, upon which the actuator weight 20 quiescently sits (FIG. 1). As will be understood, the stand 22 and/or platform 24 is initially sloped downwardly and towards a position where the handle 14 is located, with a rear-lip 26 being provided on the platform 24 so as to insure that if the actuator weight 20 were to be dislodged, it would fall in the direction of the handle 14.

As will be appreciated by those skilled in the art, any earthquake tremors that might be produced have a tendency to shake the weight 20 from off the platform 24. For conditions that are such as to completely dislodge the weight 20 from the platform 24, the falling weight, under the forces of gravity, serve to then rotate the handle 14 from its initial "horizontal" position of FIG.

1 (where the valve is opened), to the "down" position of FIG. 2 (where the handle 14 rotates the valve to shut it off). All that will be necessary to effectuate this will be seen to require that there be sufficient clearance and space for the actuator weight 20 to fully fall, and to be able to completely rotate the handle 14, with both the chain 18 and the handle 14 being constructed sufficiently strong to absorb the shock of the falling weight 20. Experimentation has shown that "weights" of between 5-10 pounds are sufficient to shut-off the valve 12 in most typical instances, but a greater weight might be required where the valve 12 is of a greater size—as where the main or pipe is part of an overall distribution system.

As will also be appreciated by those skilled in the art, the angle at which the platform 24 and stand 22 is set can be adjusted to ease, or impair, the dislodgement of the actuator weight 20 in the presence of a seismic tremor, and thereby serve as a manner of controlling the point at which the automatic shut-down will occur. In this way, the apparatus of the invention could be controlled so as to respond to tremors only beyond a prescribed Richter-magnitude level, where the ruptures of the main, or pipe, might be more likely to occur. At the same time, the frictional characteristics of the platform 24 can be selected to again ease or impair the dislodgement of the actuator weight 20, so as to select the tremor-magnitude before the apparatus becomes operative. All that is necessary, in either case, is to allow for sufficient clearance for the platform and stand to extend above the main or pipe 10 to begin with, and sufficient clearance to allow the actuator weight 20 to completely fall to rotate the handle 14 so as to seal-off the gas or water flow. In one embodiment of the invention, an actuator weight 20 of 7 pounds was employed in sitting atop a platform of a 2½ inch depth with a ¾ inch rear lip, in completely and automatically shutting-off the ball-cock valve 12 when being dislodged.

As will also be clear, the apparatus of the invention could be modified so that the falling weight 20 serves, in one instance, not only to shut-off a gas or water main, or pipe, but an additional installation could be utilized where the weight 20 couples to the main switch in an electrical circuit power-box—with the ensuing result being that when the weight 20 is dislodged from its platform 24, its gravitational fall will rotate the power-box handle to shut off the electrical power to the residence or commercial establishment.

As will equally be seen, the apparatus of the invention can be employed in comparable manner at the outside of a home or commercial establishment where the main or pipe enters—or even below ground, where appropriate, as part of an overall distributional system—as long as there exists sufficient space and clearance for the stand and platform to be erected above the main or pipe, and as long as there is sufficient clearance for the actuator weight 20 to fall sufficiently far to completely rotate the operational handle on the valve. In those installations—as well as at the outside of the residence or business establishment—, or in the inside of such locations, once the handle 14 has been rotated downwardly to shut-off the system when the tremor occurs, all that is necessary to re-activate the system once the tremor has ended, and the possibility of further damage has terminated, is to then manually re-set the handle 14 by rotating it to its horizontal position, and the gas or water flow is then reestablished (or the electrical power switched back "on"). Where the apparatus of the invention is to be incorporated outside a residence or commercial establishment, as indicated above, it will, of course, be seen desirable to have the apparatus installed within a locked enclosure so as to prevent it from being accessed by any unauthorized persons.

While there have been described what are considered to be preferred embodiments of the present invention, it will be readily appreciated by those skilled in the art that modifications can be made without departing from the scope of the teachings herein, of having an automatically operating tremor responsive shut-off valve, whose operation does not depend upon the presence of electrical energization, and whose operation follows simply under gravitational forces, yet at the same time, can be easily re-set once the producing condition has ended. For at least such reasons, therefore, resort should be had to the claims appended hereto for a true understanding of the scope of the invention.

I claim:

1. Apparatus comprising:
    a gas or water main;
    a ball-cock valve incorporated within said main;
    a handle on said valve to controllably open and close said valve;
    a stand situated above said handle, having a platform angularly sloped towards said handle; and
    an actuator weight coupled to said handle and quiescently resting on said platform;
    whereby earthquake tremors of a prescribed magnitude serve to shake said weight off said platform, and in a direction to automatically rotate said handle to close said valve.

2. The apparatus of claim 1 wherein said handle cooperates with said valve to seal off said main in response to tremors of a magnitude sufficient to dislodge said weight from said platform.

3. The apparatus of claim 1 wherein said platform is angularly adjustable to regulate the tremor magnitude needed to dislodge said weight from said platform.

4. The apparatus of claim 1 wherein said platform is of a varying friction characteristic to regulate the tremor magnitude needed to dislodge said weight from said platform.

5. The apparatus of claim 1 wherein said actuator weight is of a varying weight characteristic to regulate the tremor magnitude needed to dislodge said weight from said platform.

6. The apparatus of claim 1 wherein said platform is constructed with a raised lip rear portion providing a barrier against said weight being dislodged from said platform in an unintended direction.

7. The apparatus of claim 1 wherein said actuator weight is composed of a concrete composition.

8. The apparatus of claim 1 wherein said actuator weight is composed of a steel composition.

* * * * *